United States Patent
Mensch et al.

(10) Patent No.: US 6,874,607 B2
(45) Date of Patent: Apr. 5, 2005

(54) FRICTION CLUTCH

(75) Inventors: Waldemar Mensch, Schweinfurt (DE); Achim Link, Schweinfurt (DE); Rüdiger Berck, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/465,743

(22) Filed: Jun. 19, 2003

(65) Prior Publication Data

US 2004/0050644 A1 Mar. 18, 2004

(30) Foreign Application Priority Data

Jun. 19, 2002 (DE) .......................................... 102 27 320
May 19, 2003 (DE) .......................................... 103 22 783

(51) Int. Cl.$^7$ ........................... F16D 13/75; F16D 13/71
(52) U.S. Cl. ............... 192/70.25; 192/30 V; 192/70.27; 192/201
(58) Field of Search ............................... 192/30 V, 201, 192/70.25, 70.17, 89.22, 89.23, 89.24, 114 R, 214, 214.1, 70.27

(56) References Cited

U.S. PATENT DOCUMENTS

| | | | | |
|---|---|---|---|---|
| 5,894,916 A | * | 4/1999 | Grupp et al. | ............. 192/70.25 |
| 6,253,897 B1 | * | 7/2001 | Blard et al. | ............... 192/70.25 |
| 6,273,229 B1 | * | 8/2001 | Kimmig | .................... 192/30 V |

FOREIGN PATENT DOCUMENTS

| | | |
|---|---|---|
| DE | 42 39 289 A1 | 5/1993 |
| DE | 42 39 291 A1 | 5/1993 |
| DE | 43 06 505 A1 | 9/1993 |
| DE | 92 19 029 U1 | 3/1997 |
| DE | 42 44 919 C2 | 1/1998 |
| DE | 92 19 181 U1 | 6/1999 |
| DE | 199 10 858 A1 | 12/1999 |
| GB | 1 437 640 * | 6/1976 |
| JP | 3-33513 A * | 2/1991 |

* cited by examiner

*Primary Examiner*—Rodney H. Bonck
(74) *Attorney, Agent, or Firm*—Cohen, Pontani, Lieberman & Pavane

(57) ABSTRACT

A friction clutch with a pressure plate 6, which is mounted nonrotatably but with freedom of axial movement in a clutch housing 5, this pressure plate 6 being actuated by a pressure spring 7 in the direction toward a clutch disk 8, which can be clamped between the pressure plate 6 and an opposing pressure plate 1. More-or-less radially pretensioned friction springs 18 of a friction damping device are installed between the pressure plate 6 and a component with respect to which the pressure plate 6 can move in the axial direction. The friction springs 18 are mounted on spacer bolts 12, which project axially from the clutch housing 5, these bolts passing through corresponding openings 23 in a diaphragm spring, which serves as the pressure spring 7, the diaphragm spring being mounted on the spacer bolts 12 in such a way that its plane can be tilted.

33 Claims, 16 Drawing Sheets

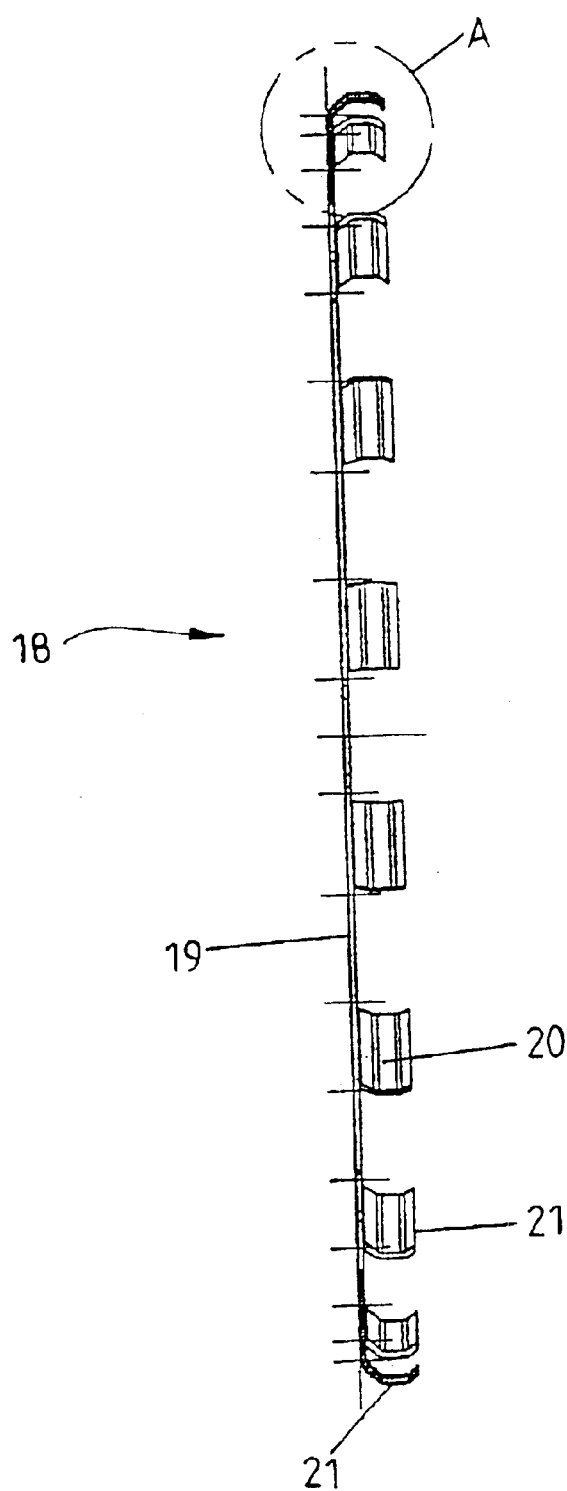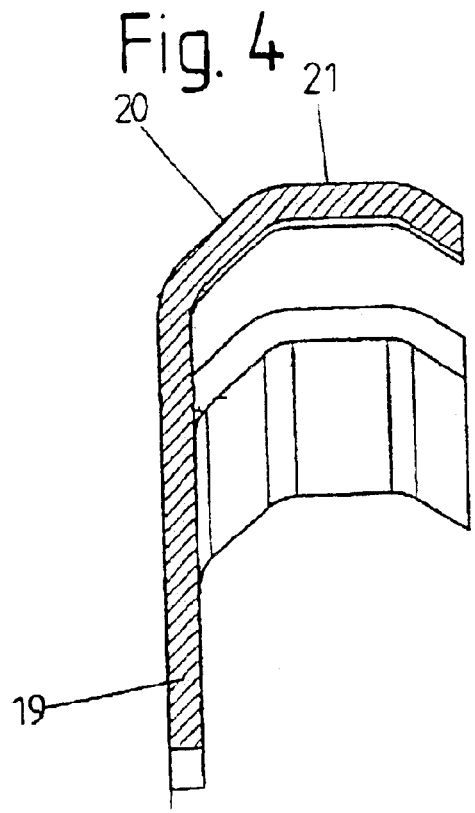

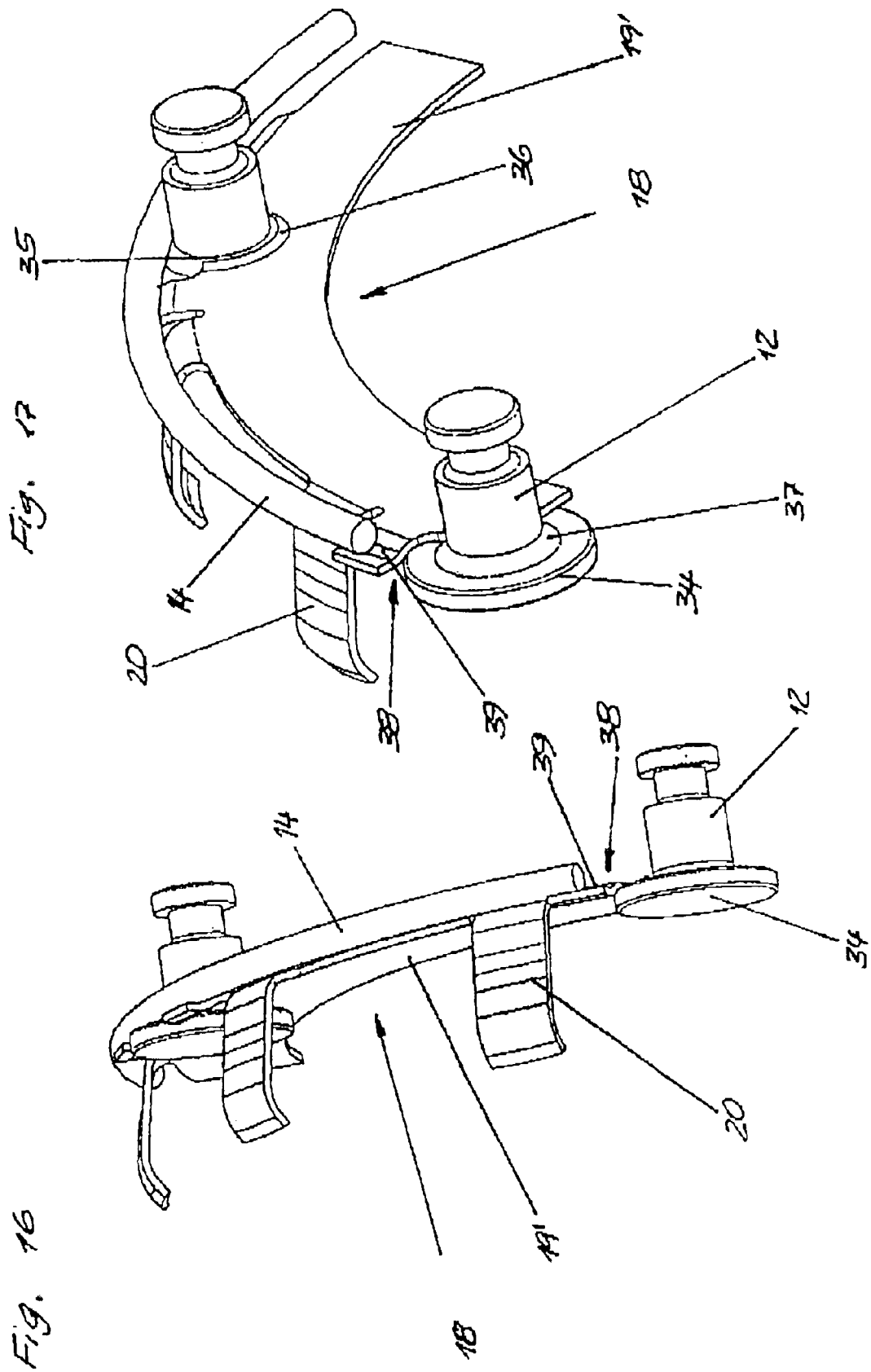

FRICTION CLUTCH

BACKGROUND OF THE INVENTION

1. Field of the Invention

The invention pertains to a friction clutch, especially for motor vehicles, with a pressure plate, mounted nonrotatably but with freedom of axial movement in a clutch housing, which plate can be actuated by a pressure spring toward a clutch disk, which can be clamped between the pressure plate and an opposing pressure plate. The more-or-less radially pretensioned friction springs of a friction damping device are located between the pressure plate and a component with respect to which the pressure plate can be moved in the axial direction.

In friction clutches, the pressure plate can be excited to vibrate at high frequencies. These vibrations are then transmitted to the clutch housing and produce unpleasant noise, i.e., so-called "squealing".

2. Description of the Related Art

In addition, pronounced axial and wobbling movements of the pressure plate lead to poor separation behavior of the friction clutch. These axial and wobbling movements of the pressure plate are excited by the axial vibrations and wobbling movements of the opposing pressure plate, which can be a flywheel. Because of these axial vibrations and wobbling movements, torque is transmitted to the clutch disk even when the clutch is completely disengaged. Because, furthermore, the natural frequency of the pressure plate is strongly excited by the engine at a certain level of engine rpm's, there is an additional axial movement of the pressure plate in this rpm range, and the amount of torque being transmitted is increased even more.

A friction clutch of the type described above is known from U.S. Pat. No. 5,894,916, in which a damping device is provided to damp the vibrations of the pressure plate. The damping device has friction springs, the arms of which rest under pretension radially from the inside against the friction surfaces of the pressure plate. The arms of the springs are located on a disk spring, which has extensions, which cooperate with support areas on the clutch housing. A bayonet type of lock is provided between the support areas and the extensions of the disk spring to connect the disk spring to the clutch housing.

This design is complicated and requires a considerable amount of assembly work.

SUMMARY OF THE INVENTION

The object of the invention is therefore to create a friction clutch of the type indicated above which is of simple design and can be assembled easily, which effectively damps the development of vibrations and noise, and which ensures the good separation behavior of the friction clutch.

According to the invention, the friction springs are mounted on spacer bolts, which project axially from the clutch housing. These bolts project through appropriate openings in a diaphragm spring, which serves as the pressure spring. The diaphragm spring is mounted on the spacer bolts in such a way that the plane of the spring can tilt.

As a result of this design, friction is produced by the relative movement between the pressure plate and the friction springs, and this friction has the effect of damping axial movement and thus of reducing the noise of the pressure plate. At the same time, as a result of the two different purposes served by the spacer bolts, the friction clutch is simple in design and can be easily assembled.

By varying the number of friction springs, the degree to which the friction damping device can damp vibrations can be adjusted.

So that the diaphragm spring can be tilted easily, the spring can rest against tilt rings, which are supported on the clutch housing and/or on stops at the free ends of the spacer bolts.

One of the tilt rings can be located between the stops and the diaphragm spring, so that the tilt ring is prevented from working itself into the stops.

Because the friction springs are fastened to the free ends of the spacer bolts, the springs are small and easy to assemble.

For this purpose, the end surfaces of the friction springs can be easily attached to the free ends of the spacer bolts.

The end surfaces of the friction springs can be easily attached to the free ends of the spacer bolts by means of rivets or screws.

So that they can act on the pressure plate, the friction springs can have arms, which project away from the spacer bolts and rest under more-or-less radially outward-directed pretension against the friction surfaces of the pressure plate.

Because the friction springs are located on a fastening ring and are arranged on, preferably fastened to, the spacer bolts by means of the fastening ring, the number of components and thus the amount of assembly work can be decreased, and the friction springs can be manufactured easily.

The tilt ring can be prevented from working itself into the stops on the bolts by placing the fastening ring onto the spacer bolts so that the bolts pass through the holes in the ring and so that the fastening ring is between the stops and the tilt ring.

To reduce the axial length of the friction clutch, the pressure spring can be supported by a tilt ring on radially oriented support elements of a fastening ring, which carries the friction springs, and the fastening ring can be supported axially on stops on the free ends of the spacer bolts, where the support elements are located between the spacer bolts, and where the support areas of the support elements which support the tilt ring are offset to project more-or-less into the plane of the stops on the spacer bolts.

The tilt ring will not interfere with the movement of the friction springs if the spring arms of the friction springs are designed to pass, with clearance, under the tilt ring, radially on the inside, and to project from there more-or-less toward the opposing pressure plate.

So that the fastening ring can be positioned easily on the spacer bolts, the fastening ring can have axial through-openings, through which the spacer bolts pass.

If the ring-shaped area of the fastening ring which extends radially inward from the spacer bolts is designed to slant toward the pressure plate, the inside diameter of this ring-shaped area cannot receive any axial support from the pressure spring, and thus the ring cannot exert any effect on the actuating forces or on the service life of the pressure spring. The almost complete absence of effects on the pressure spring makes it easier to adjust the frictional force of the friction clutch.

To arrive at a simple design with only a small number of components, the stops on the spacer bolts can be provided by the heads of the bolts, which are expanded in the radial direction.

To prevent the radially inner edge of the fastening ring supported on the stops from working itself into the shafts of the spacer bolts, the areas of the openings in the fastening ring completely or partially surrounding the spacer bolts can be provided with radii which extend away from the spacer bolt heads. This is especially advantageous when the transition from the shaft of the spacer bolt to the head is provided with a radius.

Another solution to the problem in question is achieved by mounting the friction springs on the clutch housing and by providing them with arms, which rest under more-or-less radially outward-directed or radially inward-directed pretension against the friction surfaces of the pressure plate. Here, too, the relative motion between the pressure plate and the friction springs produces friction, which has the effect of damping axial movement and thus of reducing the noise of the pressure plate.

Here, too, it is possible to adjust the degree of damping by varying the number of friction springs.

The arms of the springs are preferably attached at one end to an area of the clutch housing which is more-or-less radially outside the associated friction surfaces, whereas the free ends of the springs act on the friction surfaces in a more-or-less radially inward direction.

The spring arms can be easily attached by rivets to the clutch housing.

To reduce the number of components and the amount of assembly work, the friction springs can be mounted on a fastening ring and arranged on, preferably fastened to, the clutch housing by means of the fastening ring.

In another solution to the problem in question, the friction springs can be located on the pressure plate and rest under more-or-less radially outward-directed pretension against friction surfaces of the clutch housing, where the friction springs are preferably fastened by means of rivets or screws to the pressure plate. To reduce the number of components and the amount of assembly work, these friction springs can be mounted on a fastening ring and arranged on, preferably fastened to, the pressure plate by means of the fastening ring.

In this variant as well, the relative movement between the pressure plate and the friction springs produces friction, which has the effect of damping axial movement and thus of reducing noise.

In the case of a friction clutch of the type indicated above in which the friction springs are mounted on the opposing pressure plate, which is designed as a flywheel nonrotatably connected to the clutch housing, and rest under more-or-less radially inward-directed pretension against the friction surfaces of the pressure plate, another solution to the problem is achieved by designing the free ends of the friction springs so that they can latch into latching recesses provided in the friction surfaces when the pressure plate is lifted from the clutch disk.

Because the friction springs latch in the latching recesses in the disengaged state, the pressure plate is held in a positive and/or nonpositive manner in its disengaged position, so that the axial vibrations of the pressure plate and thus also the unwanted transmission of torque are prevented with an especially high degree of reliability, and an especially good separation behavior can also be achieved.

In the case of a friction clutch in which the friction springs are mounted on the opposing pressure plate, which is designed as a flywheel nonrotatably connected to the clutch housing, and rest under more-or-less radially inward-directed or outward-directed pretension against friction surfaces of the pressure plate, another solution to the problem in question is achieved by providing the friction springs with additional mass at their free ends.

As a result of the additional mass, the centrifugal forces and thus the contact forces of the friction springs against the friction surfaces are increased, so that, at high rpm's, the friction is reinforced and thus the damping action is increased, which improves the separation behavior and also makes it possible to reduce the amount of elastic force which the friction springs must produce, which means that the springs can be made smaller.

If the friction springs are mounted on a fastening ring and are arranged on, preferably fastened to, the opposing pressure plate by means of the fastening ring, the number of components and thus also the amount of assembly work are reduced.

The effort required to produce and assemble friction springs combined with a fastening ring can be reduced in an especially effective manner by stamping/bending the friction springs and the fastening ring as a single unit out of spring plate.

In almost any of the many possible solutions, the free ends of the friction springs can latch in latching recesses provided in the friction surfaces after the pressure plate has been lifted from the clutch disk, which means that the friction springs latch in the latching recesses when the clutch is disengaged. As a result, the pressure plate is held in a positive and/or nonpositive manner in its disengaged position, and thus the axial vibrations of the pressure plate and also the unwanted transmission of torque are prevented in an especially reliable manner.

In almost any of the many possible solutions with friction springs pretensioned in the radially outward direction, furthermore, the friction springs can have additional mass at their free ends, which increases the centrifugal forces and thus the contact forces of the friction springs against the friction surfaces. At high rpm's, therefore, the friction is reinforced and the damping effect is increased, which also makes it possible to reduce the elastic forces which the friction springs are required to produce, and they can therefore also be made smaller.

The additional mass can be connected detachably or nondetachably to the friction springs. A detachable connection could be accomplished with screws, and a nondetachable connection could be accomplished by welding or bonding.

An especially simple design consists in forming the additional mass by flanging over the free ends of the friction springs.

A structurally integrated and thus space-saving design is obtained by designing the pressure plate so that it can be actuated by the pressure spring via a wear take-up device with at least one adjusting element, which can be displaced to compensate for wear.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a cross section through the fastening ring of FIG. 2;

FIG. 4 shows an enlarged view of section "A" of the fastening ring according to FIG. 3;

FIG. 16 shows a perspective view of a section of a thirteenth exemplary embodiment of a friction clutch in the area of a fastening ring, supported on spacer bolts;

FIG. 17 shows another perspective view of the section according to FIG. 16;

DETAILED DESCRIPTION OF THE PRESENTLY PREFERRED EMBODIMENTS

Figure 1:
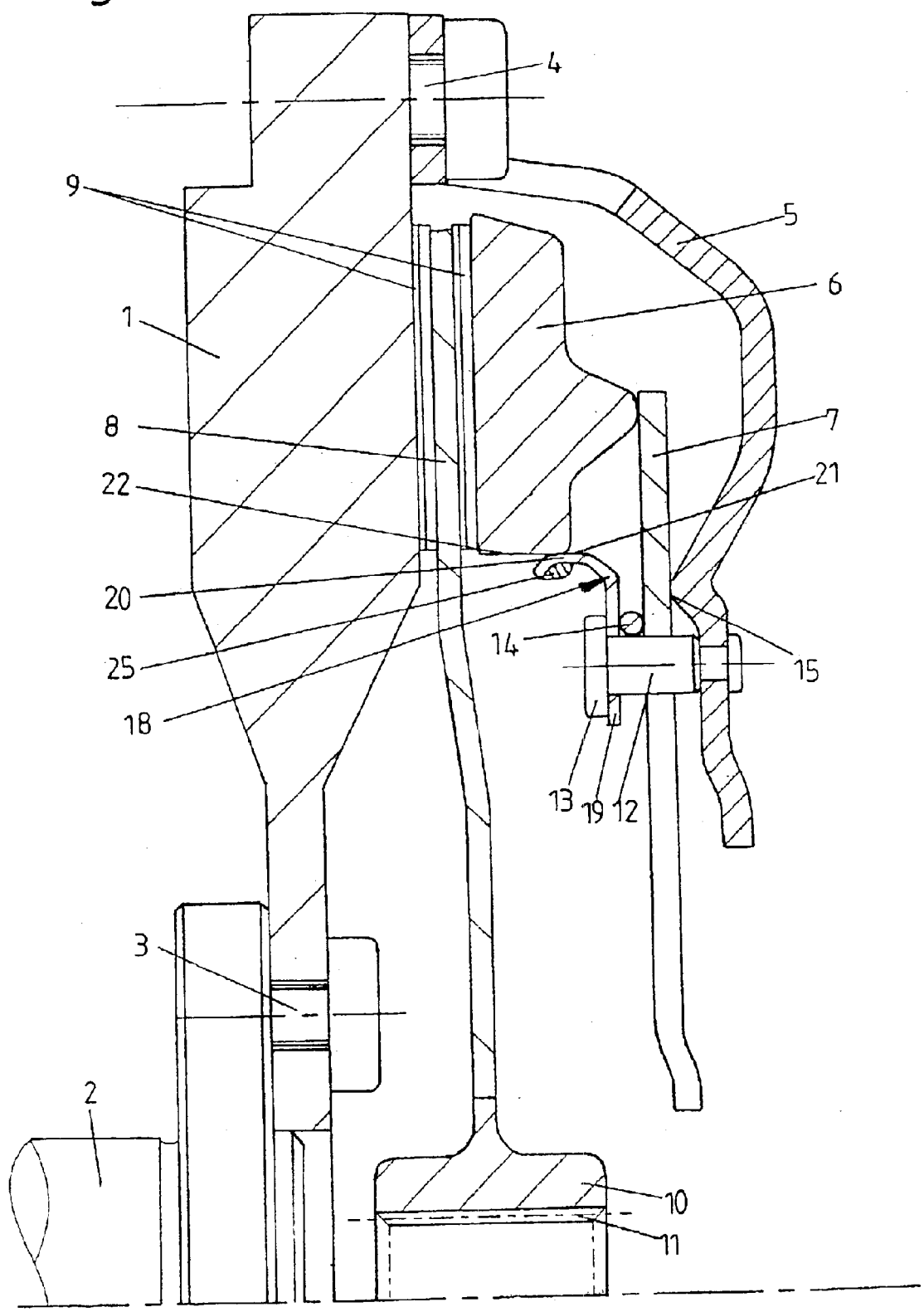
FIG. 1 shows a cross section through a first exemplary embodiment of a friction clutch.

The friction clutches shown in the figures have an opposing pressure plate 1 designed as a flywheel, which is connected nonrotatably by bolts 3 to a crankshaft 2 of an internal combustion engine.

In its outer radial circumferential edge area, the opposing pressure plate 1 is connected by bolts 4 to the edge around an opening in a pot-shaped clutch housing 5, so that the plate is coaxial to the housing. Inside the opening of the pot-like clutch housing 5, an axially movable, ring-shaped pressure plate 6 is located, which is connected nonrotatably to the clutch housing 5 and which can be actuated by a pressure spring 7, designed as a diaphragm spring, which pushes the plate in the axial direction toward the opposing pressure plate 1.

A clutch disk 8 can be clamped by the elastic force of the pressure spring 7 between the opposing pressure plate 1 and the pressure plate 6. This disk carries a clutch lining 9 on the side facing the opposing pressure plate 1 and another lining on the side facing the pressure plate 6.

The clutch disk 8 has a hub 10 coaxial to the crankshaft 2. The hub has a set of wedge-shaped teeth 11, by means of which it is mounted nonrotatably on a correspondingly designed transmission input shaft (not shown). The pressure spring 7 can be actuated by a release mechanism so that it can be tilted in its plane, thus releasing the force that acts on the pressure plate 6. Except in the exemplary embodiment according to FIG. 8, the pressure spring 7 is mounted for this purpose on spacer bolts 12, which are uniformly distributed around a concentric circle and permanently fastened by rivets to the bottom of the pot-shaped clutch housing 5 so that they project axially toward the opposing pressure plate 1. The spacer bolts 12 project through corresponding openings in the pressure spring 7, and each has a mushroom-like radial expansion at the free end, which forms a stop 13.

Tilt rings 14, which wrap radially around the circle of spacer bolts 12, are provided next to the pressure spring 7 in the axial direction, or ring-like elevations 15 are formed on the clutch housing 5, on the side of the clutch housing 5 facing the pressure spring. The plane of the pressure spring 7 can thus tilt around these rings or elevations. The tilt rings 14 located on the side of the pressure spring 7 facing away from the bottom of the clutch housing 5 are supported axially against the stops 13 on the spacer bolts 12.

Figure 8:
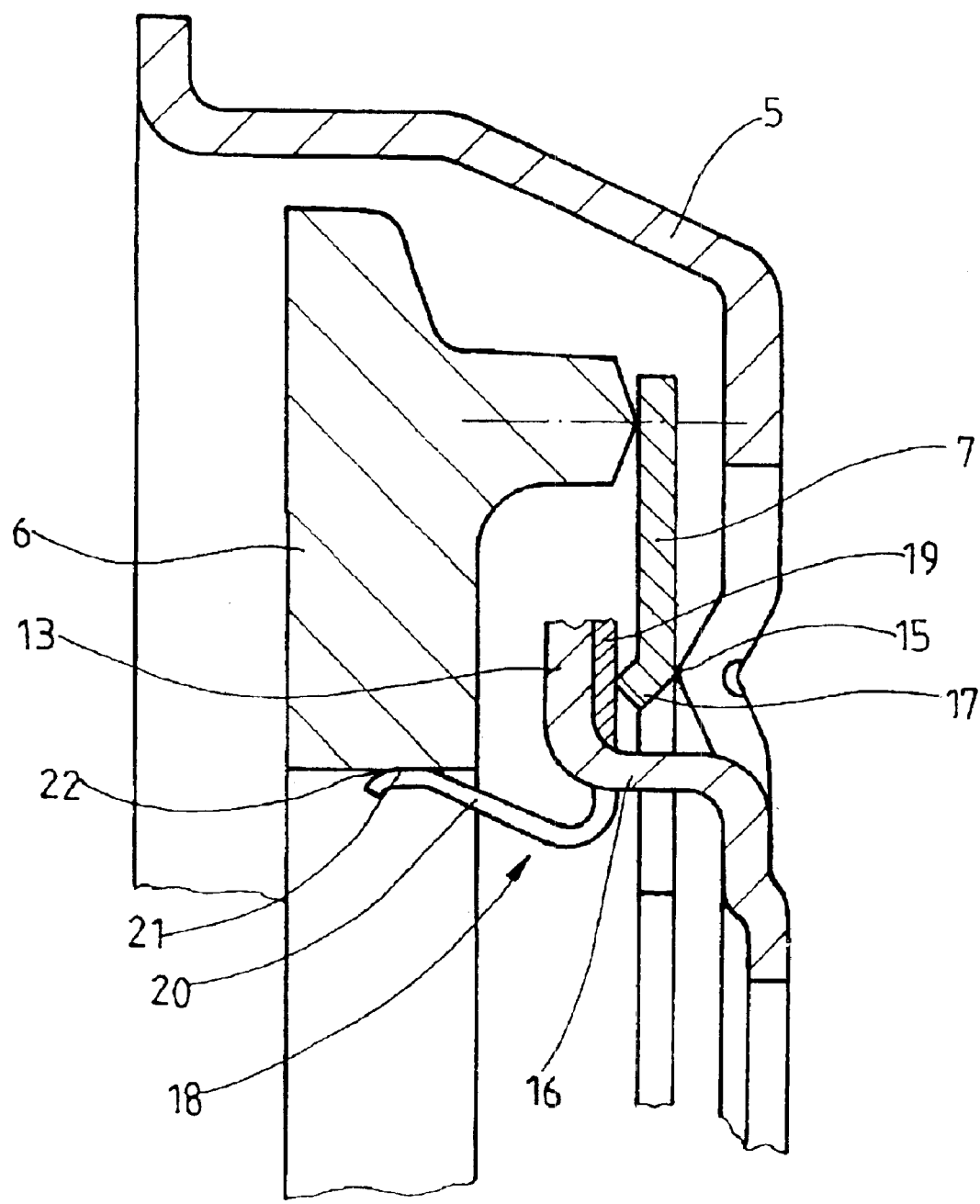
FIG. 8 shows a cross section through a part of a fifth exemplary embodiment of a friction clutch.

In FIG. 8, spacer arms 16 are provided instead of the spacer bolts, these arms being stamped out from the bottom of the pot-shaped clutch housing 5 and bent toward the opposing pressure plate 1. The free ends of the spacer arms 16 are also bent over in the radially outward direction to form the stops 13. In this case, the pressure spring 7 is provided not with a tilt ring but rather with stamped tabs 17 in the area of the spacer arms 16, these tabs being bent over toward the spacer arms 16.

In FIG. 8, the tilting of the pressure spring 7 is supported only on a ring-like elevation 15 on the bottom of the clutch housing 5.

Radially pretensioned friction springs 18, 18', 18", and 18''' of a friction-damping device are also present. This device is located between the pressure plate 6 and a component which is able to move in the axial direction with respect to the pressure plate 6. In FIGS. 1, 5, 6, 7, and 8, the friction springs 18 are of the same basic design as the friction springs 18 shown in FIGS. 2–4.

Each friction spring 18 includes a fastening ring 19, from which spring arms 20 extend in the axial direction toward the opposing pressure plate 1, the free ends of these arms having radially facing friction areas 21. These friction areas 21 of the spring arms 20 rest under radially outward-directed pretension against friction surfaces 22 on the pressure plate 6, which extend approximately in the axial direction.

To install the friction springs 18, the fastening ring 19 has axial through-openings 23, through which the spacer bolts 12 or the spacer arms 16 project.

Figure 5:
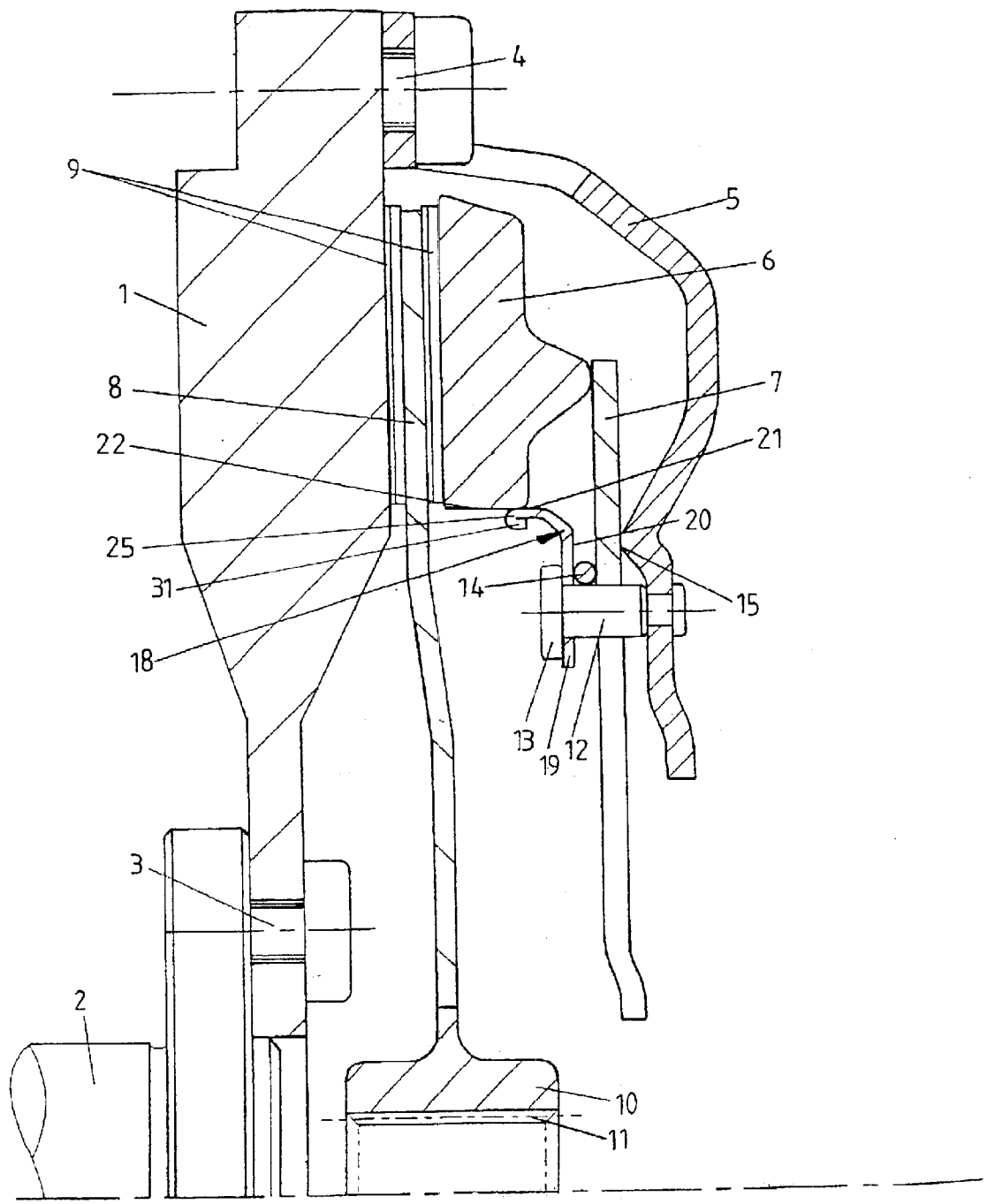
FIG. 5 shows a cross section through a second exemplary embodiment of a friction clutch.
Figure 6:
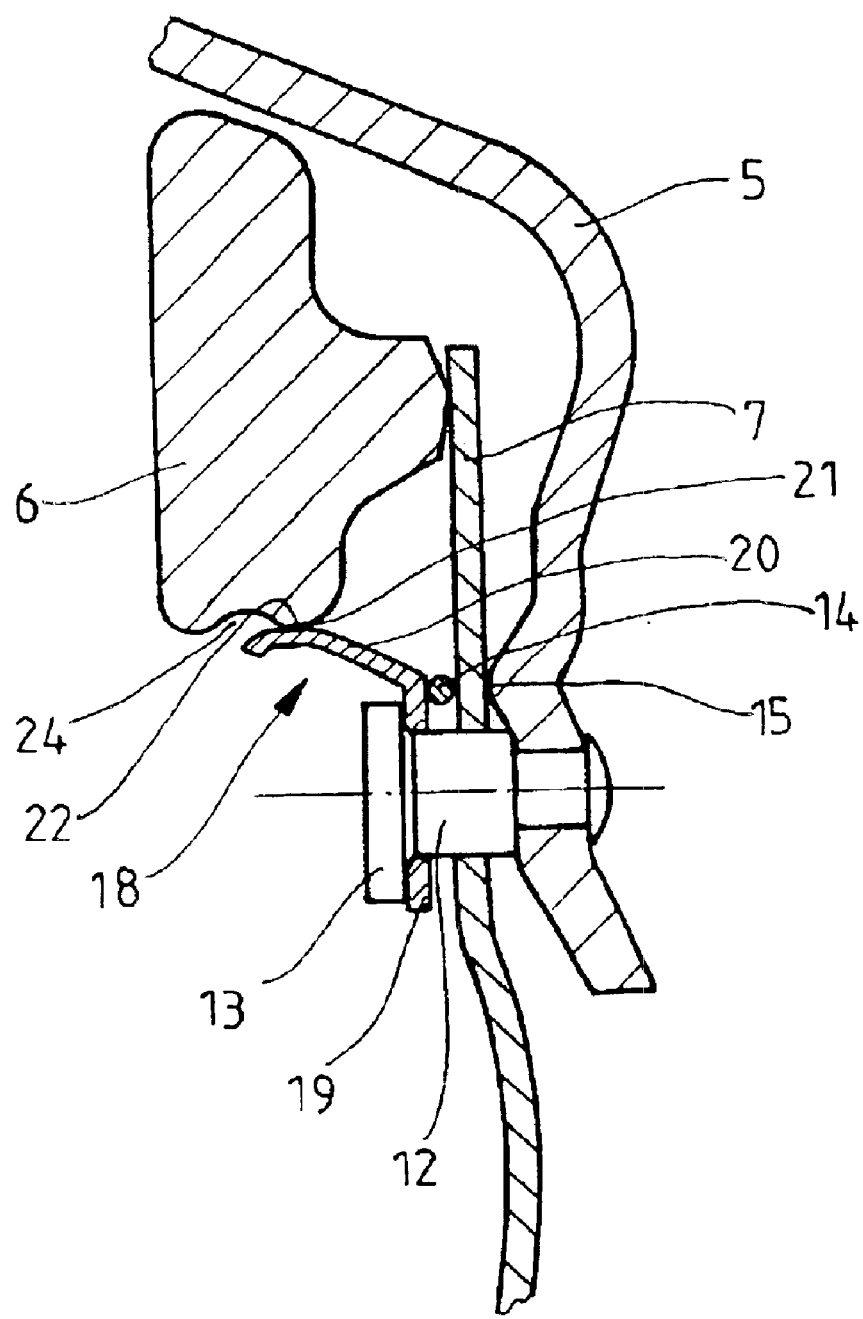
FIG. 6 shows a cross section through a part of a third exemplary embodiment of a friction clutch.
Figure 7:
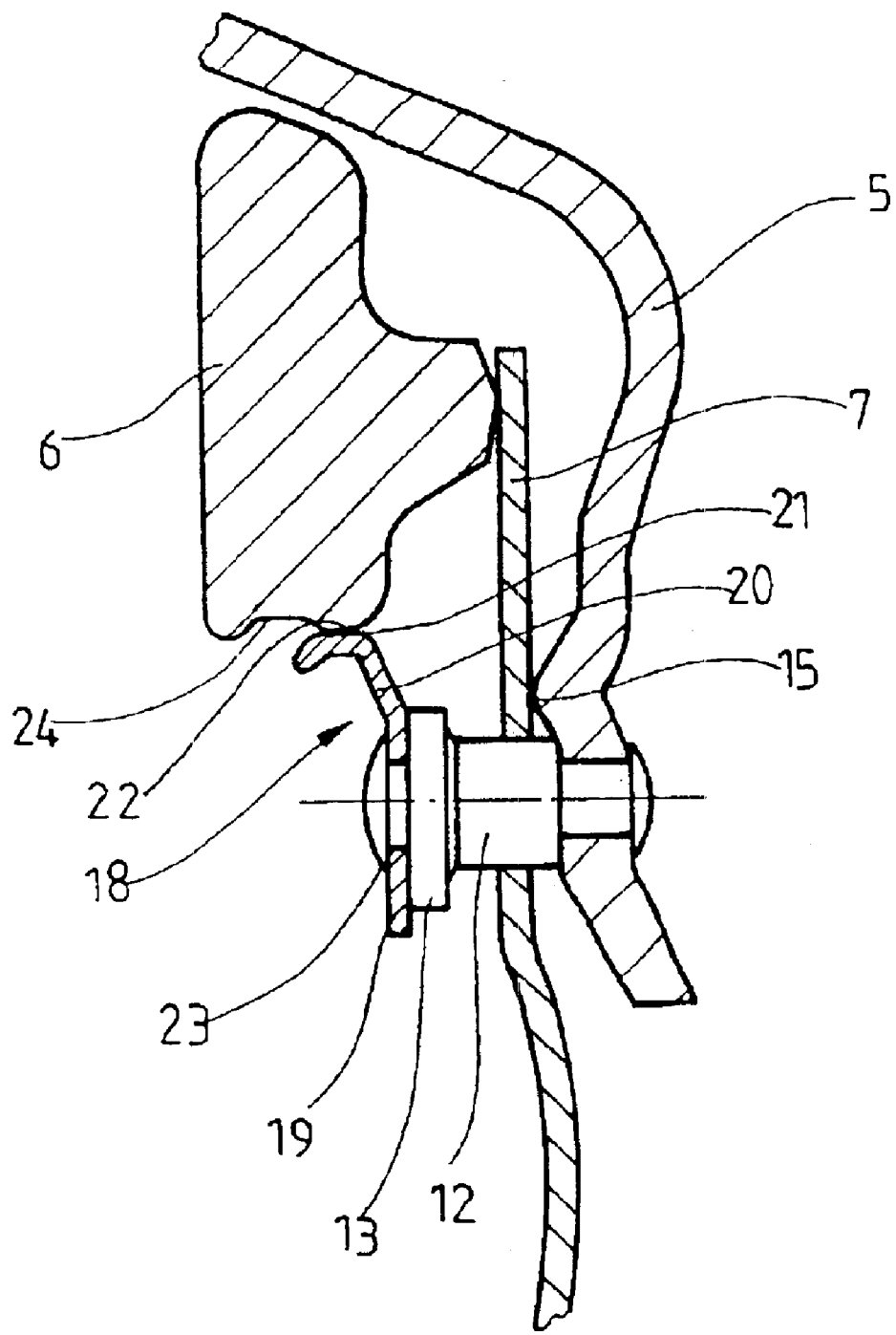
FIG. 7 shows a cross section through a part of a fourth exemplary embodiment of a friction clutch.

In FIGS. 1, 5, 6, and 8, the fastening rings 19 are mounted and thus secured in position between the stops 13 and the tilt ring 14 on the side of the pressure spring facing the stop, whereas, in the exemplary embodiment of FIG. 7, the fastening ring 19 is held on the free ends of the spacer bolts 12 projecting through the openings 23 by rivets on the side of the stops 13 facing the opposing pressure plate 1.

Whereas the friction surfaces 22 are flat over their entire axial extent in FIGS. 1, 5, and 8, latching recesses 24 are provided on the friction surfaces 22 in the exemplary embodiments of FIGS. 6 and 7. After the pressure plate 6 has been lifted from the clutch disk 8, the friction areas 21 of the spring arms 20 can latch in these recesses and hold the pressure plate 6 securely in its position, where it is separated from the clutch disk 8.

To reinforce the frictional resistance especially at high rpm's of the friction clutch, the free ends of the spring arms 20 of the friction springs 18 are provided with additional mass 25 in the exemplary embodiments according to FIGS. 1 and 5. This additional mass is welded in place in FIG. 1, whereas it formed by the flanging-over 31 of the free end of the spring arms 20 in FIG. 2.

Figure 9:
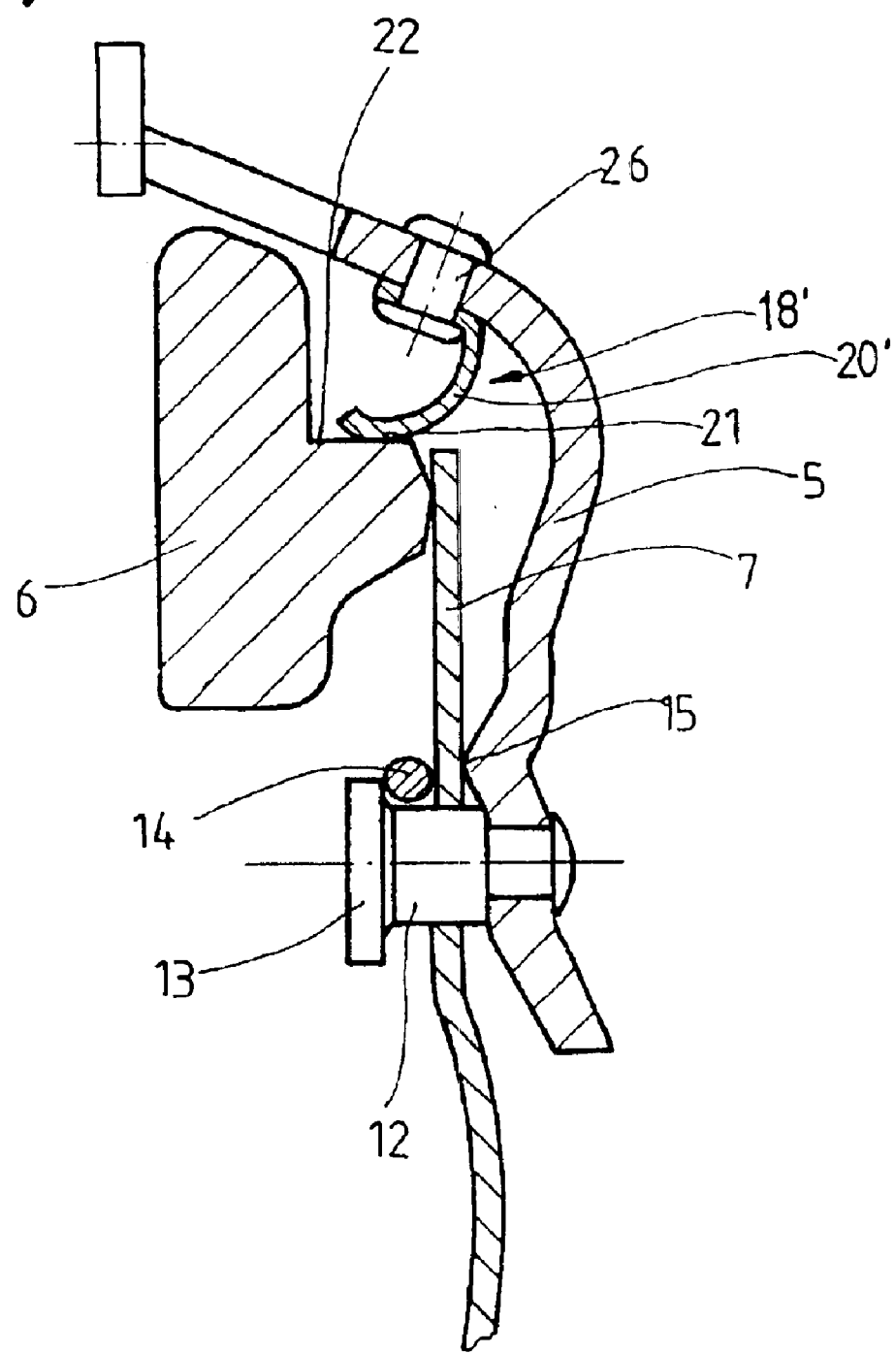
FIG. 9 shows a cross section through a part of a sixth exemplary embodiment of a friction clutch.

In the case of the exemplary embodiment according to FIG. 9, the friction springs 18' are designed as spring arms 20', which are attached at one end by rivets 26 to the edge area of the clutch housing 5, whereas the other, free ends have radially facing friction areas 21, which rest under radially inward-directed pretension against a friction surface 22 of the pressure plate 6. Here, too, the friction surface 22 extends approximately in the axial direction.

Figure 10:
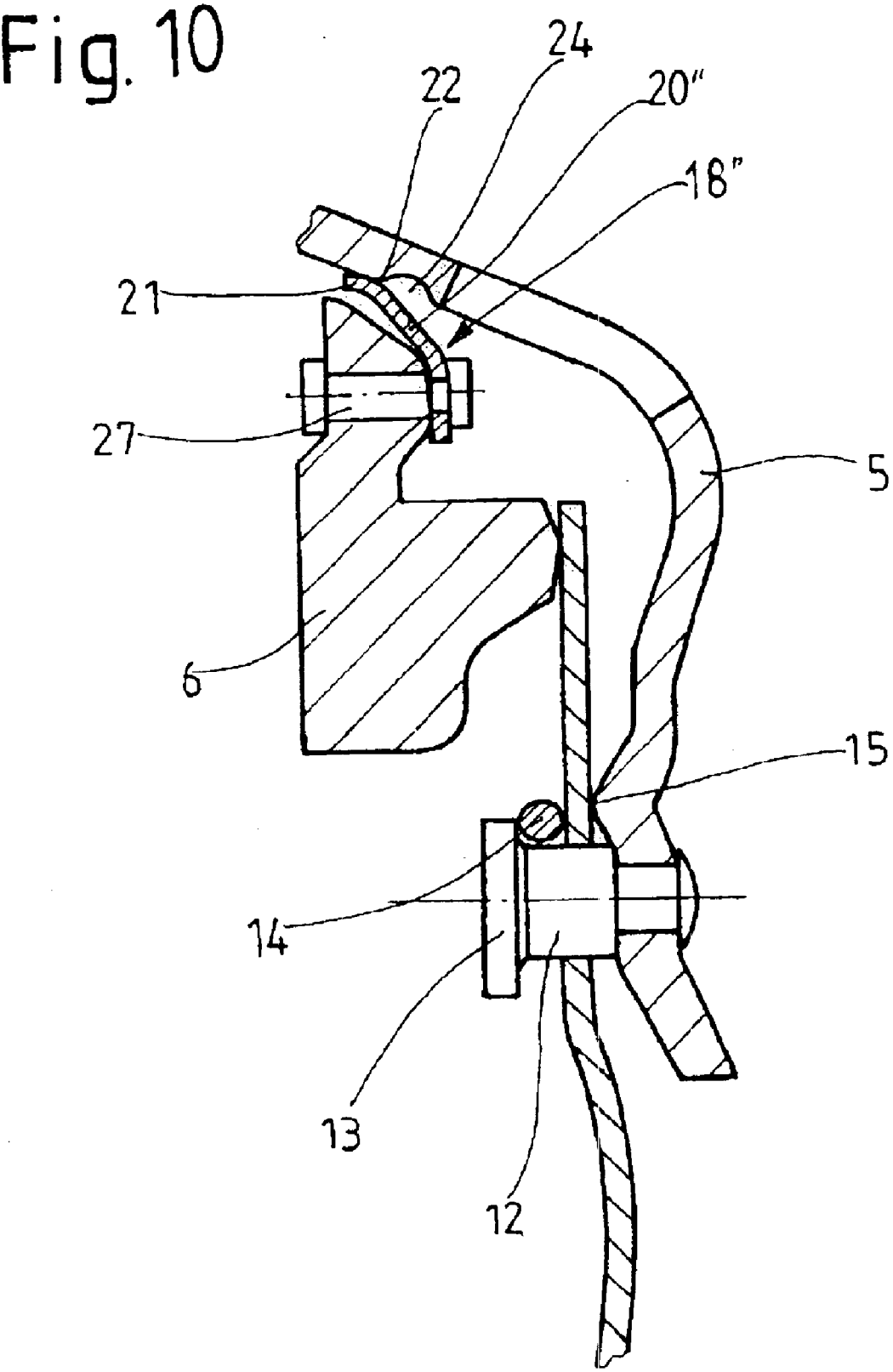
FIG. 10 shows a cross section through a part of a seventh exemplary embodiment of a friction clutch.
Figure 11:
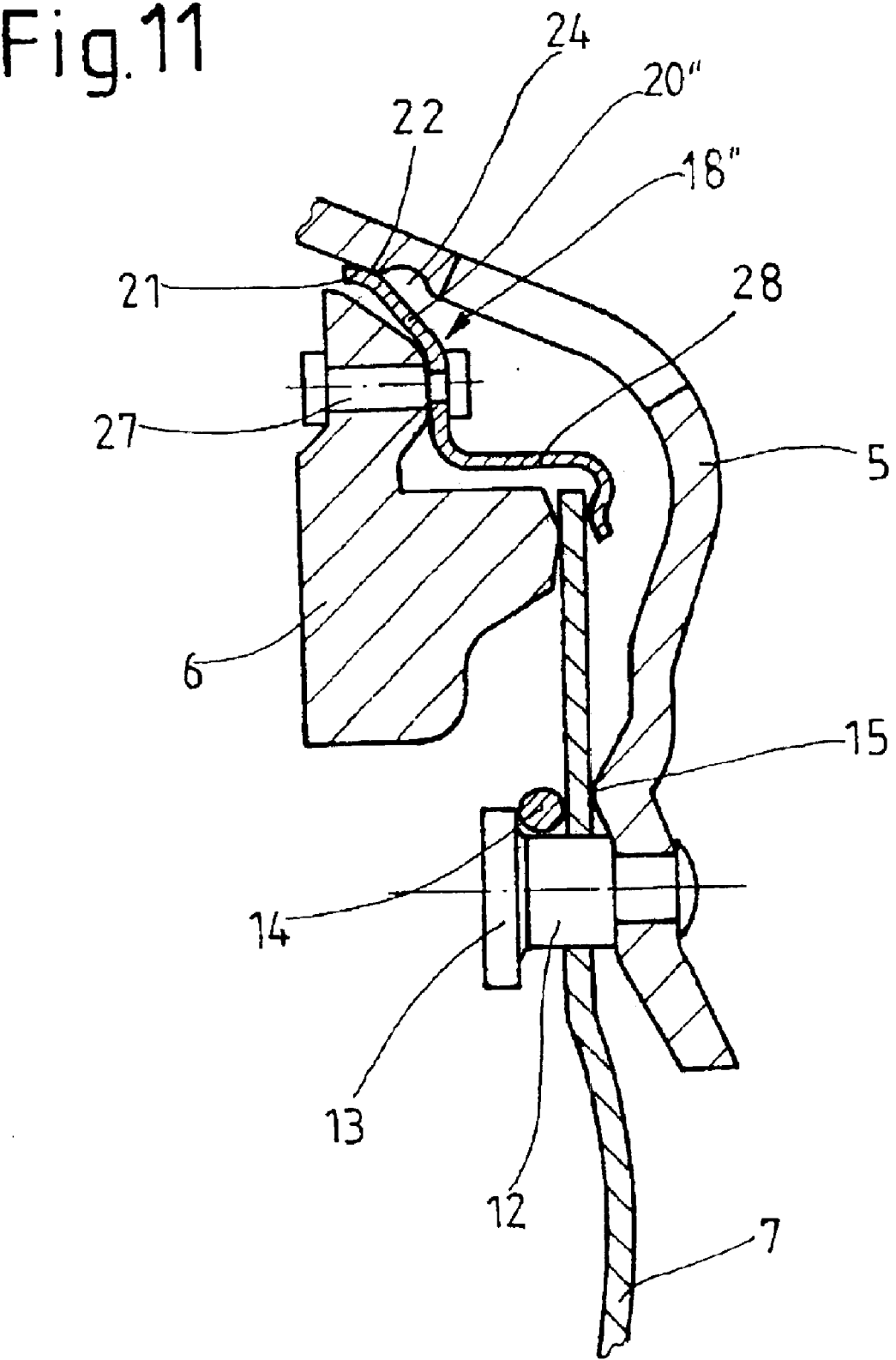
FIG. 11 shows a cross section through a part of an eighth exemplary embodiment of a friction clutch.
Figure 12:
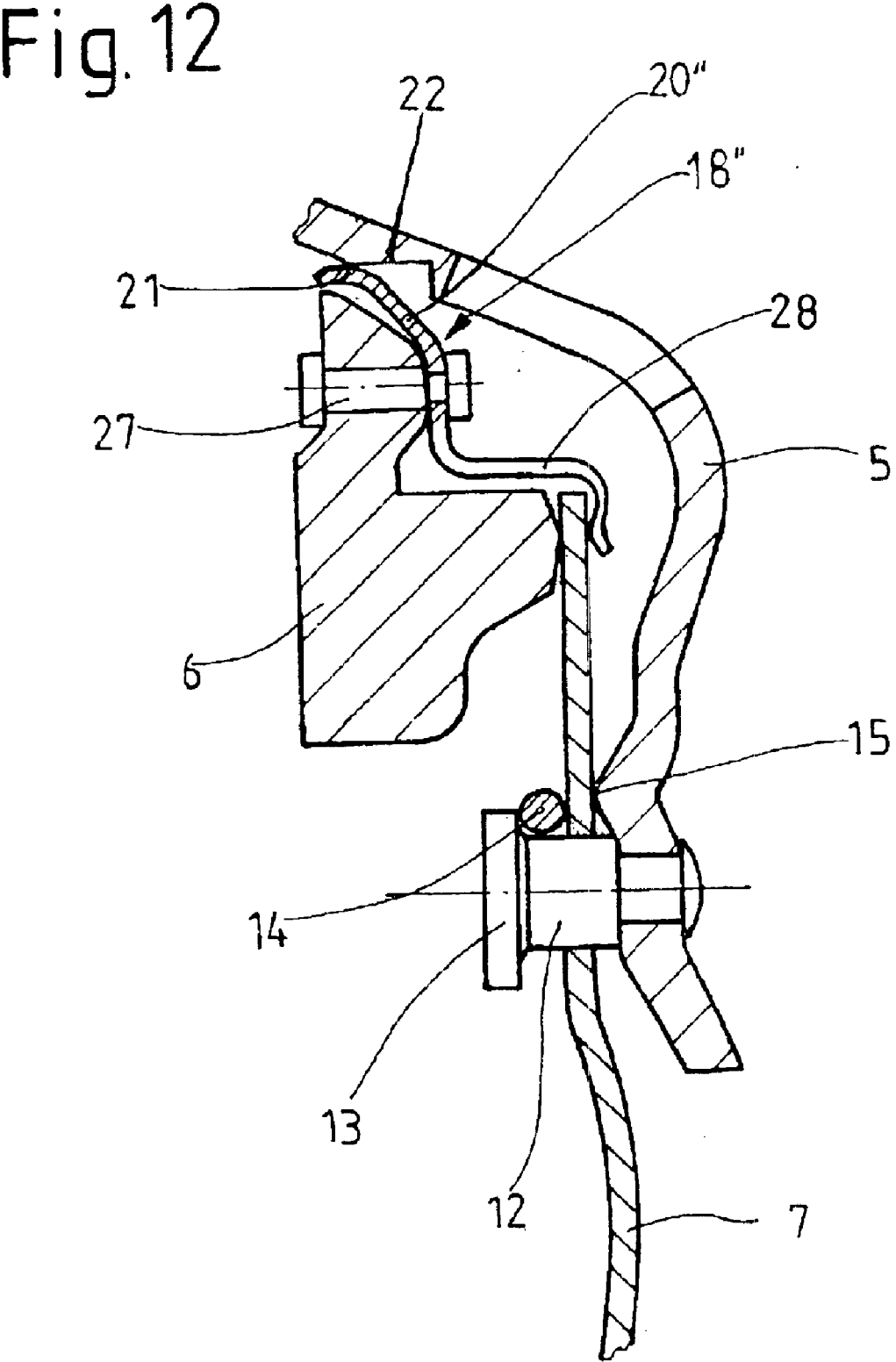
FIG. 12 shows a cross section through a part of a ninth exemplary embodiment of a friction clutch.

In the exemplary embodiments of FIGS. 10, 11, and 12, the friction springs 18" are spring arms 20", which are attached at one end by rivets 27 to the pressure plate 6. At their free ends, the spring arms 20" have friction areas 21 facing more-or-less radially, by which the arms rest under radially outward-directed pretension against friction surfaces 22, which are formed on the clutch housing 5. The housing radially encloses the pressure plate, but is a certain distance away from it. In this case, the friction surfaces 22 also have latching recesses 24, corresponding to those of the exemplary embodiments of FIGS. 6 and 7 previously described.

In the case of the exemplary embodiments of FIGS. 11 and 12, the friction springs 18" are made as integral parts of an additional spring arm 28, which extends axially to the area where the pressure plate 6 is actuated by the pressure spring 7 and grips around the pressure spring 7 in such a way that the spring is held under elastic pretension against the pressure plate 6. Thus the additional spring arm 28 forms a restoring spring, by means of which the pressure plate 6 is lifted from the clutch disk 8 when the pressure spring 7 swivels back into the release position.

Figure 13:
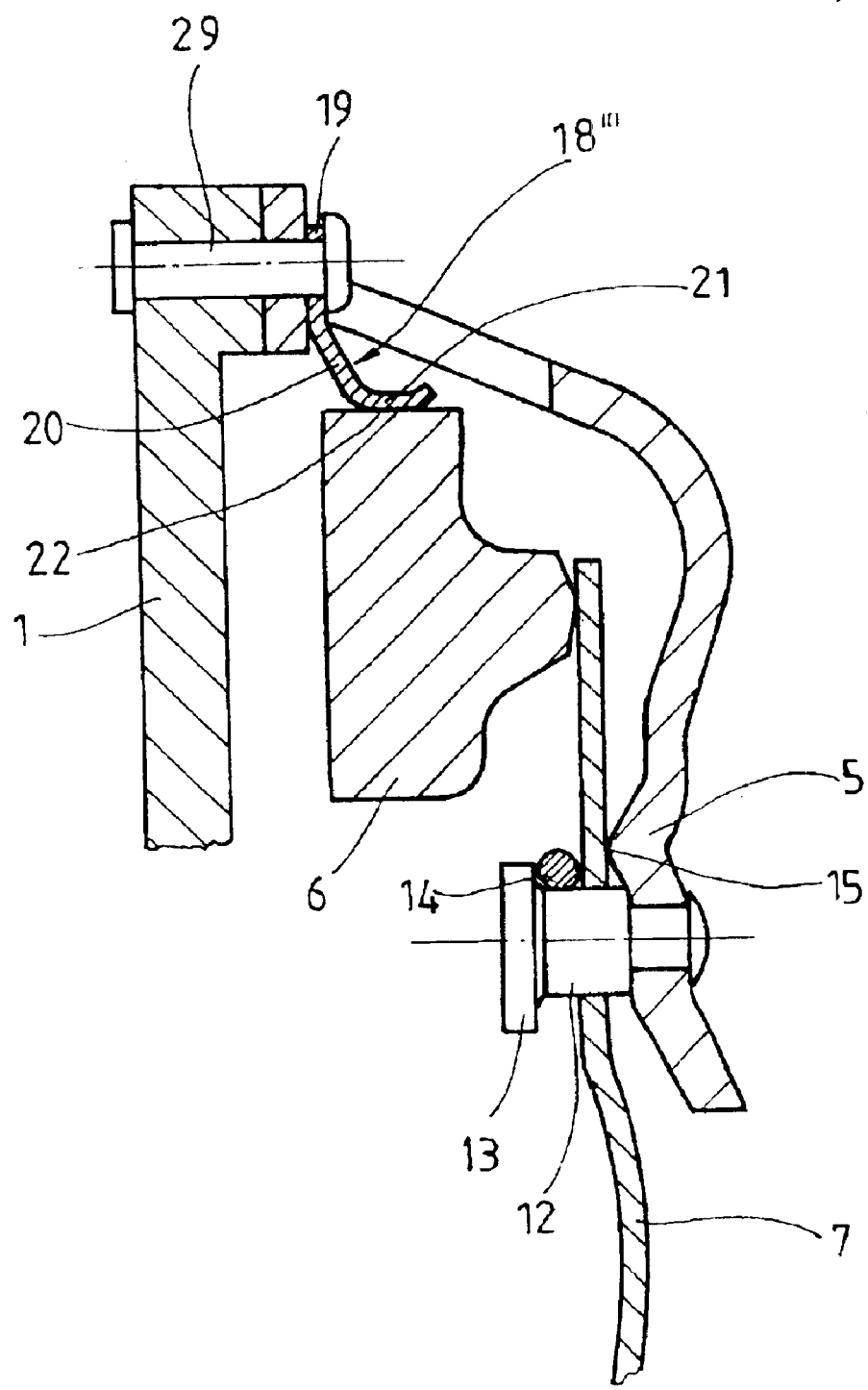
FIG. 13 shows a cross section through a part of a tenth exemplary embodiment of a friction clutch.
Figure 14:
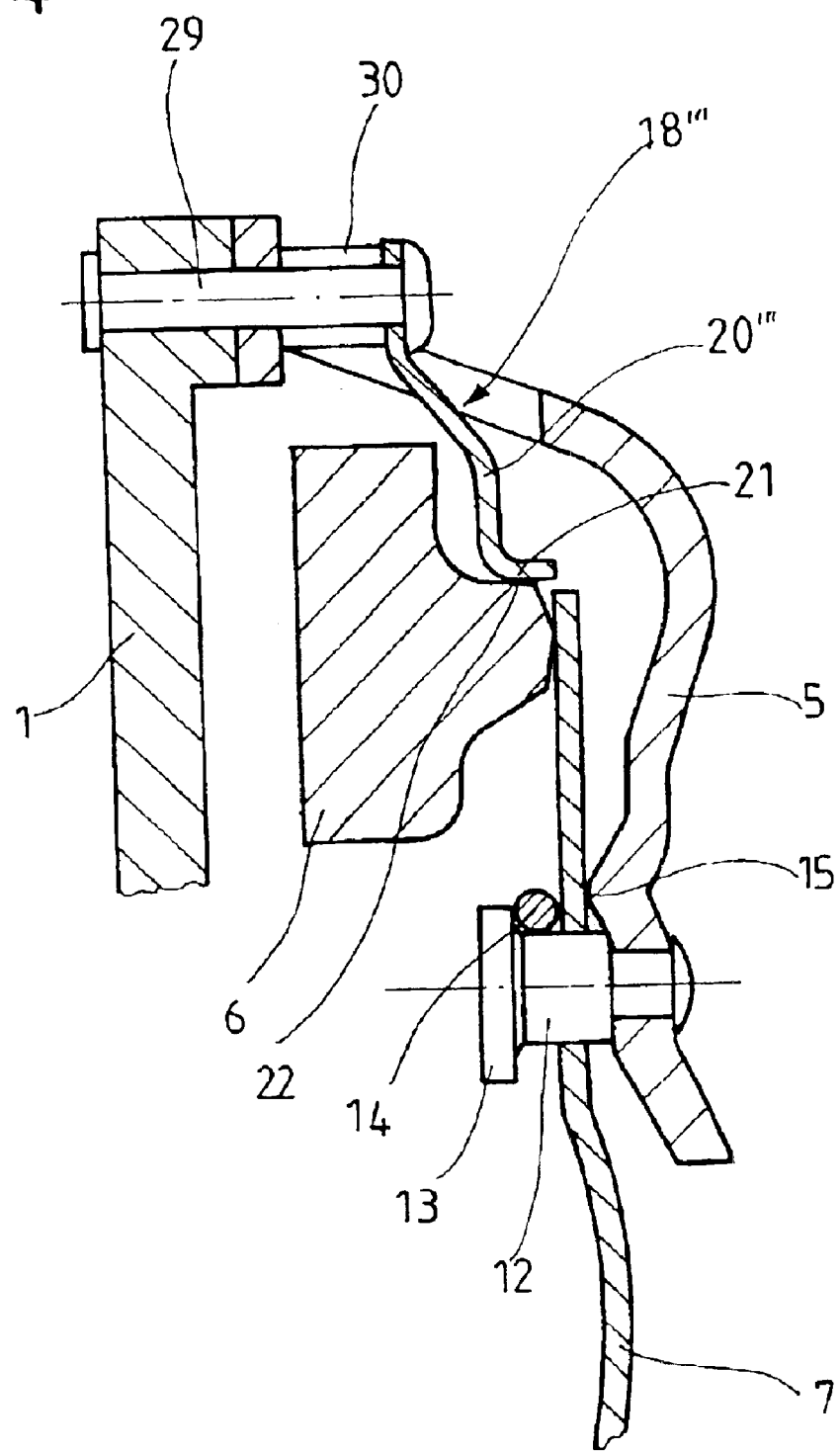
FIG. 14 shows a cross section through a part of an eleventh exemplary embodiment of a friction clutch.

In the exemplary embodiments of FIGS. 13 and 14, the friction springs 18''', which are designed as spring arms 20''', are attached at one end by rivets 29 to the opposing pressure plate 1, whereas the friction areas 21, which are provided at the free ends of the arms and which face more-or-less radially inward, rest against the friction surfaces 22 of the pressure plate 6, which surfaces extend approximately in the axial direction.

So that, in FIG. 14, the friction spring 18''' can be located in the area of the pressure plate 6 facing away from the opposing pressure plate 1, it is connected at its fastening end to the opposing pressure plate 1 by way of a spacer sleeve 30, through which the rivet 29 extends.

Figure 15:
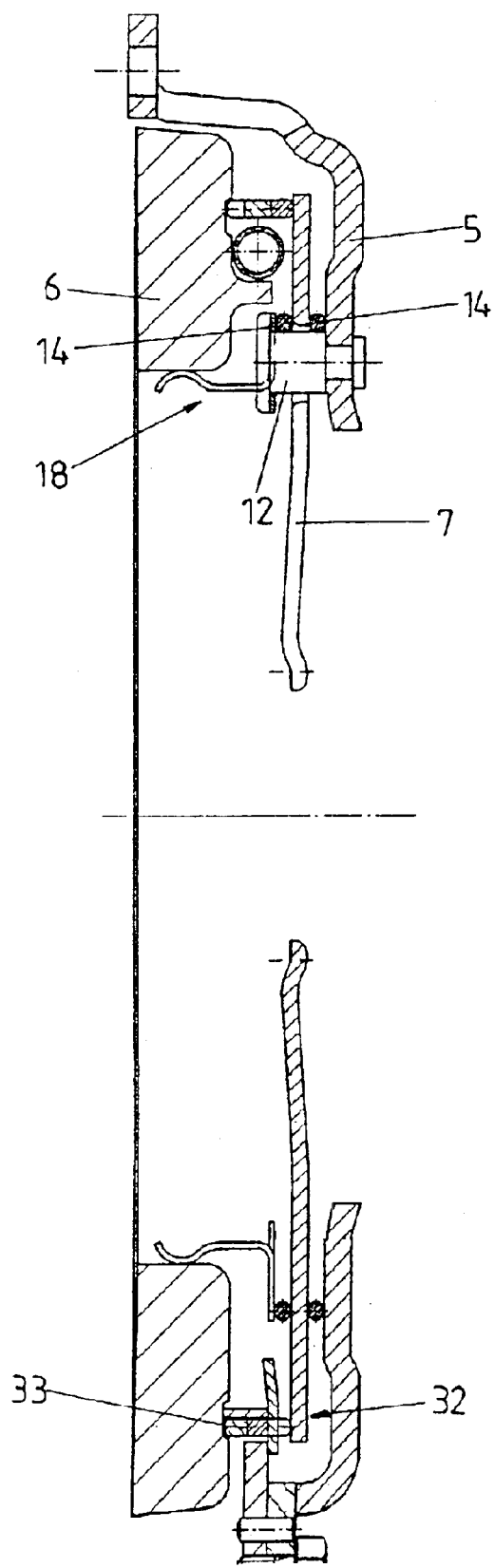
FIG. 15 shows a cross section through a part of a twelfth exemplary embodiment of a friction clutch.

The basic design of the exemplary embodiment of FIG. 15 is similar to that of FIG. 6. Instead of being supported by way of a ring-like elevation on the clutch housing, however, the pressure spring 7 is supported here on the clutch housing 5 by another tilt ring 14.

The other difference is that the pressure plate 6 is not actuated directly by the pressure spring 7. Instead, the pressure spring actuates it indirectly by way of a wear take-up device 32 with an adjusting element, which can be displaced to compensate for wear. With respect to the design and function of a wear take-up device of this type, reference is made to DE 199 10 858 A1, DE 92 19 181 U1, DE 92 19 029 U1, DE 43 06 505 A1, DE 42 44 919 C2, U.S. Pat. No. 5,409,091, and U.S. Pat. No. 5,565,561.

Figure 2:
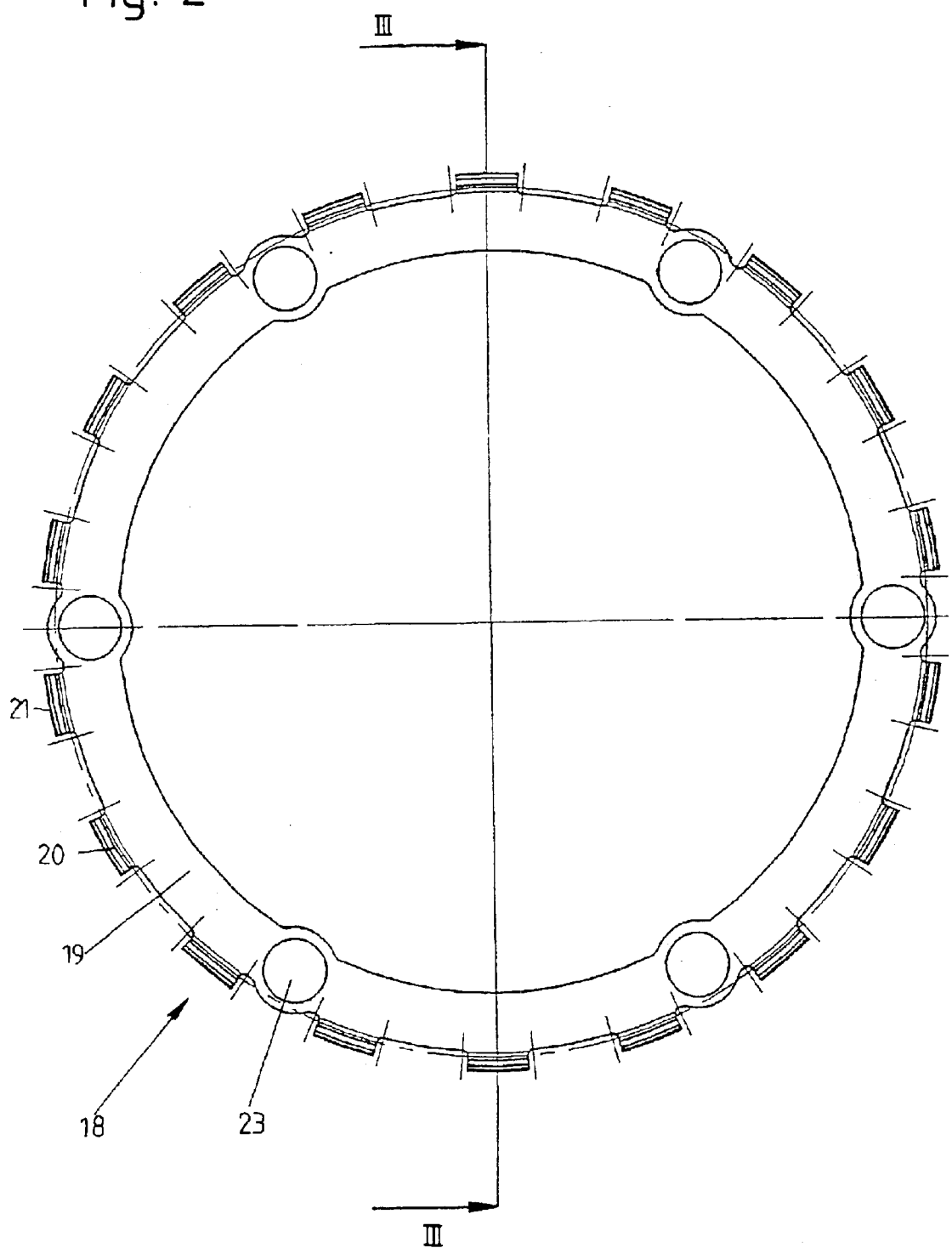
FIG. 2 shows a plan view of a fastening ring with friction springs.
Figure 18:
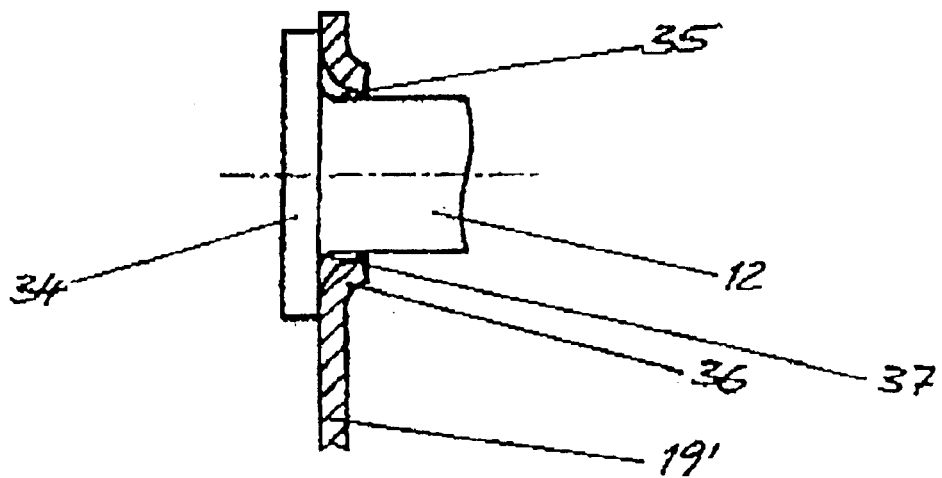
FIG. 18 shows an enlarged cross section of the area of the head of the spacer bolt of the friction clutch according to FIG. 16.

In the exemplary embodiment according to FIGS. 16–18, the spring arms 20 are more-or-less the same as the spring arms 20 of the friction springs 18 shown in FIGS. 2, 3, and 4. These friction springs 18 are mounted on a fastening ring 19' and project from the fastening ring 19' approximately in the direction toward a base plate (not shown). As they proceed toward the base plate, they pass, with clearance, under a tilt ring 14, radially on the inside.

The fastening ring 19' is supported axially on the radially expanded heads 34 at the free ends of the spacer bolts 12. These expanded heads form stops 13. The fastening ring 19' has openings 35, through which the spacer bolts 12 pass.

In the areas surrounding the spacer bolts 12, the openings 35 are provided with radii 36, extending away from the heads 34 of the spacer bolts.

The transition from the shaft of the spacer bolt 12 to the head of the spacer bolt 35 is also provided with a radius 37.

In the area between the spacer bolts 12, the fastening ring 19' has tab-like, more-or-less radially outward-extending support elements 38, each of which has a support area 39, on which the tilt ring 14 is supported axially; these support areas are offset more-or-less into the plane of the spacer bolt heads 34.

As a result, the support areas 39, and to some extent the tilt ring 14, also are located in the plane of the spacer bolt heads 34. This leads to a reduction in the axial dimension of the friction clutch.

The fastening ring 19', with its friction springs 18 and the support elements 38, is bent/stamped as a single unit out of spring plate.

Figure 19:
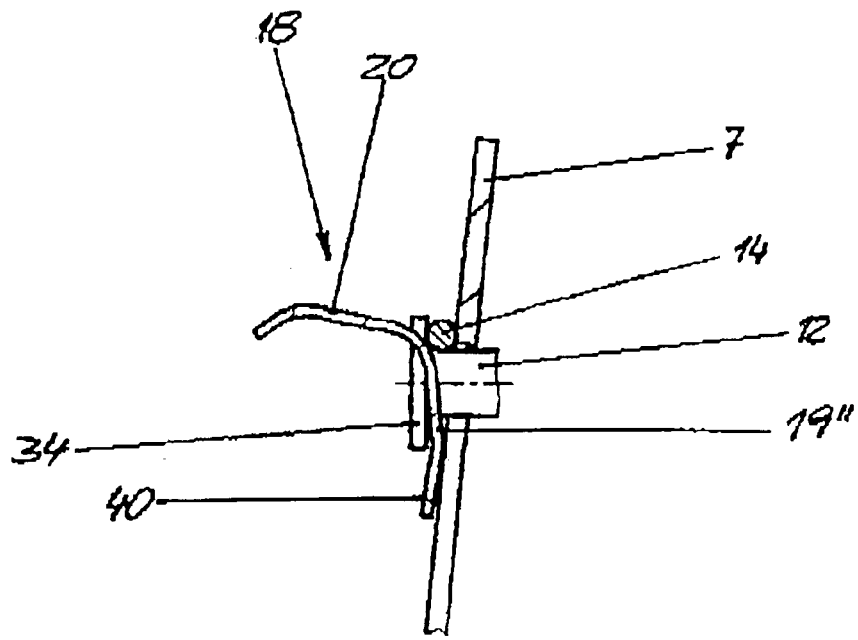
FIG. 19 shows a cross section in the area of the spacer bolt of another exemplary embodiment of a friction spring equipped with a fastening ring.

In the case of the fastening ring 19" shown in FIG. 19, the ring-shaped area 40 proceeding radially inward from the spacer bolts 14 is slanted toward an opposing pressure plate (not shown). Thus, when the pressure spring 7 tilts around the tilt ring 14, this ring-shaped area 40 cannot exert any force in the direction opposed to this tilting movement on the pressure spring 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A friction clutch for mounting to a flywheel in a motor vehicle, said friction clutch comprising:
    a clutch housing which can be fixed to said flywheel;
    a pressure plate mounted essentially non-rotatably but with freedom of axial movement with respect to said housing;
    a plurality of spacer bolts which project axially from the clutch housing and having free ends distal to said housing;
    a diaphragm spring which acts as a pressure spring to urge said pressure plate toward said flywheel, said diaphragm spring having openings through which said spacer bolts pass, said diaphragm spring being mounted on said spacer bolts so that said diaphragm spring can tilt with respect to said housing; and
    a friction damping device comprising a plurality of radially pretensioned friction springs installed between the pressure plate and a component with respect to which the pressure plate can move axially, wherein the friction springs are attached to the free ends of the spacer bolts.

2. A friction clutch as in claim 1 wherein said free ends of said spacer bolts are provided with stops, said friction clutch further comprising tilt rings supported axially on at least one of said housing and said stops, said diaphragm spring resting against said tilt rings.

3. A friction clutch as in claim 2 wherein one of said tilt rings is mounted between the stops and the diaphragm spring.

4. A friction clutch as in claim 1 wherein said friction springs have end surfaces which are attached to the free ends of the spacer bolts.

5. A friction clutch as in claim 1 wherein said friction springs are attached to the free ends of the spacer bolts by one of rivets and screws.

6. A friction clutch as in claim 1 wherein said friction springs have spring arms which project radially outward and are radially pretensioned against the pressure plate.

7. A friction clutch as in claim 6 further comprising a fastening ring arranged on said spacer bolts, said spring arms extending from said fastening ring.

8. A friction clutch as in claim 7 wherein said fastening ring and said friction springs are stamped and formed as a single part from spring plate.

9. A friction clutch as in claim 1 wherein said pressure plate has friction surfaces with latching recesses, said friction springs having free ends which can latch in said latching recesses.

10. A friction clutch as in claim 1 wherein said friction springs have free ends which are provided with additional mass.

11. A friction clutch as in claim 10 wherein said free ends are formed with a flanged over portion to provide said additional mass.

12. A friction clutch as in claim 1 further comprising a wear take-up device with at least one adjusting element which can be shifted to compensate for wear, said wear take-up device being interposed between said diaphragm spring and said pressure plate.

13. A friction clutch for mounting to a flywheel in a motor vehicle, said friction clutch comprising:
    a clutch housing which can be fixed to said flywheel;
    a pressure plate mounted essentially non-rotatably but with freedom of axial movement with respect to said housing;
    a plurality of spacer bolts which project axially from the clutch housing and having free ends distal to said housing, the free ends having stops;
    a fastening ring supported axially on the free ends of the spacer bolts and having radially oriented support elements located between the spacer bolts and offset into a plane of the stops;
    a tilt ring which is axially supported on said support elements;
    a diaphragm spring which acts as a pressure spring to urge said pressure plate toward said flywheel, said diaphragm spring having openings through which said spacer bolts pass, said diaphragm spring being mounted on said spacer bolts so that said diaphragm spring can tilt with respect to said housing; and
    a friction damping device comprising a plurality of radially pretensioned friction springs installed between the pressure plate and a component with respect to which the pressure plate can move axially, said friction springs having spring arms which extend radially outward from said fastening ring and are radially pretensioned against the pressure plate.

14. A friction clutch as in claim 13 further comprising tilt rings supported axially on at least one of said housing and said stops, said diaphragm spring resting against said tilt rings.

15. A friction clutch as in claim 14 wherein one of said tilt rings is mounted between the stops and the diaphragm spring.

16. A friction clutch as in claim 13 wherein said spring arms pass radially inside the tilt ring with clearance.

17. A friction clutch as in claim 13 wherein said fastening ring and said friction springs are stamped and formed as a single part from spring plate.

18. A friction clutch as in claim 13 wherein said pressure plate has friction surfaces with latching recesses, said friction springs having free ends which can latch in said latching recesses.

19. A friction clutch as in claim 18 wherein said free ends are formed with a flanged over portion to provide said additional mass.

20. A friction clutch as in claim 13 wherein said friction springs have free ends which are provided with additional mass.

21. A friction clutch as in claim 13 further comprising a wear take-up device with at least one adjusting element which can be shifted to compensate for wear, said wear take-up device being interposed between said diaphragm spring and said pressure plate.

22. A friction clutch for mounting to a flywheel in a motor vehicle, said friction clutch comprising:
- a clutch housing which can be fixed to said flywheel;
- a pressure plate mounted essentially non-rotatably but with freedom of axial movement with respect to said housing;
- a plurality of spacer bolts which project axially from the clutch housing and having free ends distal to said housing;
- a fastening ring arranged on the spacer bolts, the fastening ring having axial through openings which receive respective said spacer bolts;
- a diaphragm spring which acts as a pressure spring to urge said pressure plate toward said flywheel, said diaphragm spring having openings through which said spacer bolts pass, said diaphragm spring being mounted on said spacer bolts so that said diaphragm spring can tilt with respect to said housing; and
- a friction damping device comprising a plurality of radially pretensioned friction springs installed between the pressure plate and a component with respect to which the pressure plate can move axially, said friction springs having spring arms which extend radially outward from said fastening ring and are radially pretensioned against the pressure plate.

23. A friction clutch as in claim 22 wherein said free ends of said spacer bolts are provided with stops, said friction clutch further comprising tilt rings supported axially on at least one of said housing and said stops, said diaphragm spring resting against said tilt rings.

24. A friction clutch as in claim 23 wherein one of said tilt rings is mounted between the stops and the diaphragm spring.

25. A friction clutch as in claim 22 wherein said fastening ring is supported axially on the free ends of the spacer bolts and has radially oriented support elements located between the spacer bolts and offset into a plane of the stops, the friction clutch further comprising a tilt ring which is axially supported on said support elements.

26. A friction clutch as claim 22 wherein said fastening ring has an annular area which extends radially inward from the spacer bolts and slants toward the flywheel.

27. A friction clutch as in claim 22 wherein said free ends have stops, said stops forming heads of said spacer bolts.

28. A friction clutch as in claim 27 wherein said fastening ring is formed with radii which surround said through openings and extend axially away from heads of said spacer bolts.

29. A friction clutch as in claim 22 wherein said fastening ring and said friction springs are stamped and formed as a single part from spring plate.

30. A friction clutch as in claim 22 wherein said pressure plate has friction surfaces with latching recesses, said friction springs having free ends which can latch in said latching recesses.

31. A friction clutch as in claim 22 wherein said friction springs have free ends which are provided with additional mass.

32. A friction clutch as in claim 31 wherein said free ends are formed with a flanged over portion to provide said additional mass.

33. A friction clutch as in claim 22 further comprising a wear take-up device with at least one adjusting element which can be shifted to compensate for wear, said wear take-up device being interposed between said diaphragm spring and said pressure plate.

* * * * *